United States Patent
Hagen

(10) Patent No.: US 9,163,591 B2
(45) Date of Patent: Oct. 20, 2015

(54) METHOD FOR OPERATING A FUEL SYSTEM, AND FUEL SYSTEM

(75) Inventor: Harald Hagen, Creussen (DE)

(73) Assignee: AUDI AG, Ingolstadt (DE)

(*) Notice: Subject to any disclaimer, the term of this patent is extended or adjusted under 35 U.S.C. 154(b) by 698 days.

(21) Appl. No.: 13/328,333

(22) Filed: Dec. 16, 2011

(65) Prior Publication Data

US 2012/0180760 A1 Jul. 19, 2012

(30) Foreign Application Priority Data

Dec. 21, 2010 (DE) .................. 10 2010 055 313

(51) Int. Cl.
| | |
|---|---|
| F02M 25/08 | (2006.01) |
| B60K 15/035 | (2006.01) |
| F02D 41/00 | (2006.01) |
| F02D 41/04 | (2006.01) |
| B60K 15/03 | (2006.01) |

(52) U.S. Cl.
CPC ...... *F02M 25/0836* (2013.01); *B60K 15/03519* (2013.01); *F02D 41/0032* (2013.01); *F02D 41/042* (2013.01); *F02M 25/089* (2013.01); *B60K 2015/0319* (2013.01); *B60K 2015/0321* (2013.01); *B60K 2015/03289* (2013.01); *B60K 2015/03296* (2013.01); *B60K 2015/03388* (2013.01); *B60K 2015/03514* (2013.01); *F02D 2200/0602* (2013.01); *F02D 2200/0606* (2013.01)

(58) Field of Classification Search
CPC .......................... F02M 25/0836; F02M 25/089
USPC .................................. 123/518–520
See application file for complete search history.

(56) References Cited

U.S. PATENT DOCUMENTS

| | | | |
|---|---|---|---|
| 5,259,412 A | 11/1993 | Scott et al. | |
| 5,479,905 A * | 1/1996 | Ito | 123/520 |
| 5,497,754 A | 3/1996 | Ito | |
| 5,603,349 A | 2/1997 | Harris | |
| 6,305,362 B1 | 10/2001 | Kitamura | |
| 8,200,411 B2 * | 6/2012 | DeBastos et al. | 701/102 |
| 2003/0226549 A1 * | 12/2003 | Takagi et al. | 123/520 |
| 2011/0247593 A1 * | 10/2011 | Yoshizaki et al. | 123/520 |
| 2011/0284125 A1 | 11/2011 | Hagen | |

(Continued)

FOREIGN PATENT DOCUMENTS

| | | |
|---|---|---|
| CN | 101670778 A | 3/2010 |
| DE | 19838959 | 3/2000 |

(Continued)

OTHER PUBLICATIONS

Chinese Search Report issued on Apr. 3, 2015 in counterpart Chinese Patent Application No.

(Continued)

*Primary Examiner* — Erick Solis
(74) *Attorney, Agent, or Firm* — Henry M. Feiereisen LLC

(57) ABSTRACT

In a method for operating a fuel system of an internal combustion engine, the fuel system has a fuel tank and a ventilation device for ventilating the fuel tank which has at least one ventilation valve. In a first operating mode the ventilation valve is adjusted for ventilating the fuel tank based exclusively on a temperature and/or the ventilation occurs over a defined period of time when the internal combustion engine is deactivated. The invention further relates to a fuel system of an internal combustion engine.

35 Claims, 4 Drawing Sheets

(56) References Cited

U.S. PATENT DOCUMENTS

2011/0295482 A1* 12/2011 Pearce et al. .................. 701/102
2012/0085424 A1   4/2012 Hagen
2012/0111307 A1   5/2012 Hagen

FOREIGN PATENT DOCUMENTS

| DE | 19913440 | 10/2000 |
|---|---|---|
| DE | 102007034824 | 1/2009 |
| DE | 10 2009 009 901 A1 | 4/2010 |
| DE | 102008062243 | 6/2010 |
| DE | 102009009901 | 8/2010 |
| DE | 102010014558 | 10/2011 |
| FR | 2802862 A1 | 6/2001 |
| GB | 2 286 695 A | 8/1995 |
| JP | 2010-270652 A | 12/2010 |

OTHER PUBLICATIONS

English translation of Chinese Search Report issued on Apr. 3, 2015 in counterpart Chinese Patent Application No. 2011104632929.

* cited by examiner

METHOD FOR OPERATING A FUEL SYSTEM, AND FUEL SYSTEM

CROSS-REFERENCES TO RELATED APPLICATIONS

This application claims the priority of German Patent Application, Serial No. 10 2010 055 313.1, filed Dec. 21, 2010, pursuant to 35 U.S.C. 119(a)-(d).

BACKGROUND OF THE INVENTION

The invention relates to a method for operating a fuel system of an internal combustion engine, wherein the fuel system has a fuel tank and a ventilation device for ventilating the fuel tank which ventilation device has at least one ventilation valve. The invention further relates to a fuel system.

Methods of the aforementioned type are known from the state of the art. The corresponding fuel system is for example assigned to a motor vehicle or a drive system respectively, of the motor vehicle. The drive system has in particular at least one internal combustion engine and is for example configured as hybrid drive system, i.e. has the internal combustion engine as well as at least one electric machine, wherein the internal combustion engine and the electric machine at least temporarily cooperate to generate a drive torque of the drive system. The internal combustion engine is supplied with fuel by the fuel tank by the fuel system. Oftentimes, a volatile hydrocarbon is used as fuel for example gasoline. The fuel tank therefore normally contains a volume of liquid fuel as well as gaseous fuel which in particular accrues above the liquid fuel. The fuel tank can be a closed tank, in particular a pressure tank or a partially closed in particular also a pressure free tank. The closed tank is in particular used to reduce emissions.

Due to temperature fluctuations of the fuel, for example caused by changes of the ambient temperature, pressure fluctuations can occur in the fuel tank. For this reason, the ventilation device is assigned to the fuel tank. It serves for ventilating the fuel tank. In this way, excessive pressure in the fuel tank can be reduced by the ventilating device. For this purpose the ventilation device ventilates the fuel tank for example by a ventilation line. During ventilation, gaseous as well as liquid fuel can escape the fuel tank through the ventilation device or the ventilation line. The ventilated fuel thus is first present as a mixture of gaseous and liquid fuel. This is particularly the case when the fuel tank is ventilated at a high internal pressure of the fuel tank. As a result of the high pressure or the great pressure difference between the pressure inside the fuel tank and the pressure outside of the fuel tank, the ventilated fuel has high flow velocities, which causes liquid fuel to be carried along by the gaseous fuel.

The gaseous fuel can readily be supplied to the internal combustion engine or its intake system, wherein a fuel accumulator which is preferably configured as activated carbon filter can be provided between the fuel tank and the internal combustion engine. The fuel accumulator has the purpose to temporarily store gaseous fuel, i.e. to take up gaseous fuel when unused gaseous fuel is present and to give off gaseous fuel as soon as the gaseous fuel can be discharged into the internal combustion engine. However, liquid fuel must not enter the fuel accumulator or the internal combustion engine.

For this reason, the ventilation device can have at least one separation device which serves for separating gaseous and liquid fuel. The separation device thus has the purpose to prevent the transfer of liquid fuel from the fuel tank through the ventilation device into the internal combustion engine.

The separation device separates liquid fuel and allows gaseous fuel to pass. The separated liquid fuel enters a temporary accumulator of the separation device. The term temporary accumulator does not mean that a (temporary) accumulation of the liquid fuel is indeed provided for. Rather, the liquid fuel can be discharged directly out of the temporary accumulator or the separation device preferably in the direction of the fuel tank. Here, however, a rise of the fill level of the temporary accumulator may result, for example due to a limitation of the discharge volume flow, in particular by a line cross section or the like. The separated liquid fuel thus temporarily cannot be discharged at the same rate as it enters the temporary accumulator. Of course, a temporary storage of the liquid fuel, for example over a defined period of time can also be realized.

When operating the fuel system, the amount of liquid fuel present in the temporary accumulator or the separation device should be prevented from exceeding a threshold amount, i.e. from being greater than the fill level of the temporary accumulator, because this may impair the effectiveness of the separation device. The greater the amount of liquid fuel in the temporary accumulator, the greater is the risk that liquid fuel also exits the separation device together with the gaseous fuel and is carried along in the direction of the fuel accumulator or the internal combustion engine. For this reason the fuel delivery unit can be assigned to the separation device. The former is used to deliver liquid fuel out of the temporary accumulator, in particular in the direction of the fuel tank. The fuel delivery unit is usually configured as jet pump wherein fuel which is delivered by a fuel pump of the fuel system out of the fuel tank in the direction of internal combustion engine, is often used as operating means for the jet pump.

In known methods for operating the fuel system of the internal combustion engine, the ventilation of the fuel tank takes places by means of the ventilation device, usually based on the pressure inside the fuel tank and a temperature. This means that for ventilating the fuel tank the ventilation valve of the ventilation device is adjusted based on the internal pressure of the fuel tank and the temperature. However, this is only possible when the internal combustion engine is activated, because only in this case a control device which is assigned to the internal combustion engine or the fuel system respectively is activated. This control device serves for adjusting the ventilation valve for ventilating the fuel tank based on the pressure inside the fuel tank and the temperature. In phases of standstill, i.e. when the internal combustion engine and with this the control device, is deactivated the pressure inside the fuel tank is usually limited by at least one mechanical overflow valve which is configured for a typical pressure level. When the temperature in the fuel tank changes for example as a result of heat input by the internal combustion engine which is still hot from operation, or as a result of external influences, a pressure which correlates with the steam pressure of the fuel is established inside the fuel tank. When this pressure reaches or exceeds the typical pressure level and in particular a defined maximal pressure inside the fuel tank, the overflow valve opens for ventilating the fuel tank. A deactivated internal combustion engine in this context relates to an internal combustion engine at standstill, while an activated internal combustion engine is operated at least in the idle gear in particular provides a torque.

When the internal combustion engine is deactivated, the ventilation of the fuel tank thus can take place solely based on the pressure inside the fuel tank. However, oftentimes the permissible maximal pressure inside the fuel tank changes with the temperature, i.e. is dependent on the latter. In particular when the internal combustion engine is deactivated and the pressure inside the fuel tank can only be decreased via the overflow valve, it can thus occur that the fuel tank is exposed to a pressure inside the fuel tank which causes forces which exceed the strength of the fuel tank. This leads for example to unacceptable flow behavior or to undesired irreversible deformations of the fuel tank, in particular of a fuel tank shell.

SUMMARY OF THE INVENTION

Therefore, it is the object of the invention to propose a method for operating a fuel system of an internal combustion engine which does not have the mentioned disadvantages, but allows a reliable operation of the fuel system in particular also when the internal combustion engine is deactivated.

According to the invention, this is attained in that in a first operating mode the ventilation valve is adjusted for ventilation the fuel tank exclusively based on a temperature, and/or in that the ventilation occurs when the internal combustion engine is deactivated. The ventilation valve can usually be adjusted to ventilate or to close of the fuel tank. Closing of the fuel tank relates to a closing of the ventilation valve; the fuel tank thus does not have to be hermetically sealed. Thus, even though the fuel tank is closed by means of the ventilation valve, fuel can be removed or added to the fuel tank, however, not via the ventilation valve.

Adjusting the ventilation valve for ventilating the fuel tank based exclusively on the temperature is provided in particular when the internal combustion engine is deactivated. Thus, the ventilation valve is not adjusted for ventilating the fuel tank as soon as the internal fuel tank pressure exceeds a defined internal fuel tank pressure, but based on the temperature alone. On the other hand, when the internal combustion engine is deactivated, i.e. is at least in the idle operating mode, even though it is possible to select the first operating mode, an operating mode different from the latter is preferably selected, in which the ventilation valve is adjusted for ventilating the fuel tank exclusively based on a pressure or based on the temperature as well as the pressure.

Of course, the ventilation valve can also be configured in the first operating mode so that it is adjusted for ventilating the fuel tank based, beside the temperature, on at least the internal fuel tank pressure. The ventilation valve can thus be adjusted in the first operating mode to ventilate the fuel tank exclusively based on the internal fuel tank pressure or based exclusively on the temperature. Thus, the ventilation valve is always adjustable for ventilation of the fuel tank based exclusively on the temperature independent of the internal fuel tank pressure. However, in addition to the ventilation caused by the temperature, the ventilation can also be independently caused by the internal fuel tank pressure. Thus, a ventilation occurs either based exclusively on the temperature or based exclusively on the internal fuel tank pressure, however, not based on both parameters, for example based on an internal fuel tank pressure which is selected in dependence on the temperature. Thus, the ventilation valve can for example be adjusted for ventilation when the temperature exceeds a defined temperature, without the pressure, in particular the internal fuel tank pressure being greater than a defined pressure, or when the pressure exceeds the defined pressure, without the temperature being greater than the defined temperature. As an alternative or in addition however, the ventilation valve can also be adjusted based on the temperature as well as the pressure. In this case, for example the pressure at which the ventilation valve is adjusted for ventilation is selected in dependence on the temperature, or the temperature at which ventilation is to occur is selected in dependence on the pressure.

In addition or as an alternative, the ventilation can occur over a defined period of time when the internal combustion engine is deactivated. Preferably, the ventilation coincides with the deactivation. Thus, the fuel tank is ventilated when the internal combustion engine is deactivated, i.e. transitions from an activated state to an inactivated state. The ventilation can also occur immediately before, in particular until, the deactivation of the internal combustion engine. This means that the ventilation occurs uninterruptedly at least until the deactivation of the internal combustion engine. The ventilation occurs over the defined period of time. This period of time can include a predetermined period of time. As an alternative, the ventilation can also occur until the internal combustion engine is activated again.

The ventilation over a defined period of time when deactivating the internal combustion engine is provided in particular when, and/or for a defined period of time after, the temperature falls below a threshold temperature. Thus, the fuel tank is for example ventilated when deactivating the internal combustion engine only when the temperature has previously fallen below or exceeded the threshold temperature within the defined period of time before the deactivation. In particular, when the temperature falls below or exceeds the threshold temperature a flag is set and after the defined period of time has elapsed, is set back if the temperature no longer falls below or exceeds the threshold temperature. If the internal combustion engine is now to be deactivated, the ventilation occurs over the defined period of time when the flag is set.

Another alternative possibility is to operate, at least over a certain period of time, a control device which analyses the pressure and which for example is assigned to the internal combustion engine. Usually, the control device is deactivated together with the internal combustion engine so that the control device no longer functions when the internal combustion engine is deactivated. Here, however, the control device can be continued to be operated, in particular until the time point at which it can be assumed that the pressure no longer rises as a result of heat input by the internal combustion engine, to a degree which leads to damage to the fuel tank.

With this procedure, the occurrence of an impermissibly high internal fuel tank pressure can be reliably avoided, in particular also when the internal combustion engine is deactivated. As an alternative, the ventilation of the fuel tank can also be interrupted when the temperature exceeds the threshold temperature. In this way, fuel is prevented from escaping at high temperatures as a result of excessive outgassing. The ventilation can also be carried out when the temperature falls below the threshold temperature, to protect the fuel tank from an excessive internal fuel tank pressure at very low temperatures. The described method, in particular the adjustment of the ventilation valve based exclusively on the temperature, can thus be used for a multitude of applications.

In a refinement of the invention, the ventilation valve is adjusted for ventilating the fuel tank when the temperature exceeds or falls below a threshold temperature. The ventilation by means of the ventilation valve thus occurs when the temperature exceeds or alternatively falls below the threshold temperature. Multiple ventilation valves can also be provided, wherein at least one is adjusted to ventilate the fuel tank when the temperature exceeds a first threshold temperature (maximal temperature) and at least another one is adjusted to ventilate the fuel tank when the temperature falls below a second threshold temperature (minimal temperature). In this way, damages to the fuel tank as a result of a very low temperature as well as a very high temperature and the accompanying high internal fuel tank pressure can be avoided.

In a refinement of the invention, in a second operating mode, the ventilation valve is adjusted to ventilate the fuel tank based exclusively on a pressure, in particular an internal fuel tank pressure. The second operating mode can be selected when the internal combustion engine is activated. Here, the temperature as well as the pressure is used for adjusting the ventilation valve. Of course, other parameters can be used in addition as well.

In a refinement of the invention, the defined period of time is selected so that the internal fuel tank pressure is reduced by a defined differential pressure. In particular when the internal combustion engine is deactivated, the defined period of time can also be selected in dependence on a storage capacity of a fuel accumulator which servers for (temporary) accumulation of gaseous fuel. The fuel accumulator is preferably provided fluidly downstream of the ventilation valve so that when ventilating the fuel tank, ventilated fuel can enter the fuel accumulator via the ventilation valve. The defined period of time is selected in particular so that also after terminating the ventilation and when the internal combustion engine is deactivated it can be assumed that the internal fuel tank pressure permanently remains below the maximally permissible internal fuel tank pressure. The defined period of time can also be selected so that the internal fuel tank pressure is brought to an ambient pressure of the fuel system.

In a refinement of the invention, an ambient temperature, an internal fuel tank temperature, a fuel temperature, a ventilation valve temperature, a line temperature or a separation device temperature is used as temperature. In principle, the temperature can thus be any temperature which is relevant for the fuel tank or the fuel. However, particularly preferably, the temperature is a fuel tank temperature or the internal fuel tank temperature. The latter however does not have to correspond to the fuel temperature. As an alternative, the temperature of the ventilation valve or the temperature of a line, in particular a fuel conducting line can be used. Also the temperature of a separation device can be used. The separation device serves usually for separating gaseous and liquid fuel to prevent the transfer of liquid fuel from the fuel tank to the internal combustion engine or the fuel accumulator through the ventilation device. The separation device can be provided fluidly upstream or downstream of the ventilation valve and is usually assigned to the ventilation device. Preferably, the temperature is determined by measuring. It can be additionally subjected to a correction for example the addition of an offset temperature.

In a refinement of the invention, a control device analyses the temperature at least when the internal combustion engine is deactivated and adjusts the ventilation valve correspondingly, and the control device or a further control device analyses the pressure exclusively when the internal combustion engine is activated and adjusts the ventilation valve correspondingly. Thus, at least the one control device is provided which is assigned to the internal combustion engine or to the fuel system. The control device is intended to analyze the temperature when the internal combustion engine is deactivated and to correspondingly adjust the ventilation valve. At the same time, the control device or the further control device has the purpose to analyze at least the pressure and preferably the temperature when the internal combustion engine is activated and to also correspondingly adjust the ventilation valve. It may thus be provided that, when the internal combustion engine is deactivated only the one control device is activated, while the one as well as the further control device are activated when the internal combustion engine is activated, i.e. serve for adjusting the ventilation valve. It is also conceivable that when the internal combustion engine is deactivated only the one control device is activated, and when the internal combustion engine is activated only the further control device is activated so that the one or the further control device is respectively used for adjusting the ventilation valve. In a particularly advantageous embodiment, only the one control device is provided which in this case adjusts the ventilation valve based exclusively on the temperature when the internal combustion engine is deactivated and based at least on the pressure when the internal combustion engine is activated.

In a refinement of the invention, the ventilation valve is integrated in an aeration valve which switches in dependence on the fuel tank fill level, into a safety valve which is assigned to the fuel tank, into a tank lid of the fuel tank, into a separation device, into the fuel tank or into an overflow valve or fluidly arranged upstream, downstream or in parallel to the latter. The integration in one of the aforementioned elements further allows a most space saving and with this cost saving configuration of the ventilation valve. Of course, the ventilation valve can also be a separate element and fluidly assigned to the mentioned elements. The aeration valve is in particular configured as FLVV (Fill Limit Venting Valve). The latter allows aerating the fuel tank so long as the fuel tank fill level is smaller than a defined fuel fill level, in particular a maximal fuel tank fill level. Aeration of the fuel tank is thus ensured via the aeration valve, in particular when fuel is added to the fuel tank. The safety valve is configured for example as roll over safety valve ROV (Roll Over Valve). The aeration valve as well as the safety valve are usually assigned to the fuel tank and fluidly arranged upstream of the separation device, so that the fuel first passes through the aeration valve or the safety valve, respectively, before entering the separation device. The overflow valve is for example constructed as pressure relief valve, i.e. it is constructed so that it creates a flow communication between its inlet and its outlet only when the pressure differential between the latter exceeds a defined value.

BRIEF DESCRIPTION OF THE DRAWING

In a refinement of the invention, the ventilation valve has at least one temperature deforming element, in particular a temperature expansion element, preferably a wax expansion element or a bimetal expansion element. In this way, the adjustment of the ventilation valve for ventilating the fuel tank can take place exclusively mechanically without requiring an electrical or electronic control of the ventilation valve. The adjustment is thus provided by means of the temperature deforming element. The temperature deforming element is an element, which changes its shape in dependence on the temperature. It can for example be a temperature expansion element which at least increases its length with rising temperature. The temperature deforming element can for example be a wax expansion element or a bimetal element. The wax expansion element is for example a capsule which is filled with wax, whose fill volume increases or decreases in dependence on the temperature and thereby adjusts the ventilation valve for ventilating or closing, respectively the fuel tank.

The invention further relates to a fuel system of an internal combustion engine, in particular for implementing out the method according to the above elaborations, wherein the fuel system has a fuel tank and a ventilation device which has at least one ventilation valve. The fuel system is configured to adjust the ventilation valve for ventilating the fuel tank in a first operating mode exclusively based on a temperature, and/or the ventilation occurs over a defined period of time when the internal combustion engine is deactivated. The fuel system can be refined according to the above elaborations.

The invention also relates to a drive system with a fuel system according to the above elaborations, which is or can be operated in particular according to the method described above. The drive system has in particular an internal combustion engine and is for example configured as hybrid drive system.

Figure 1:
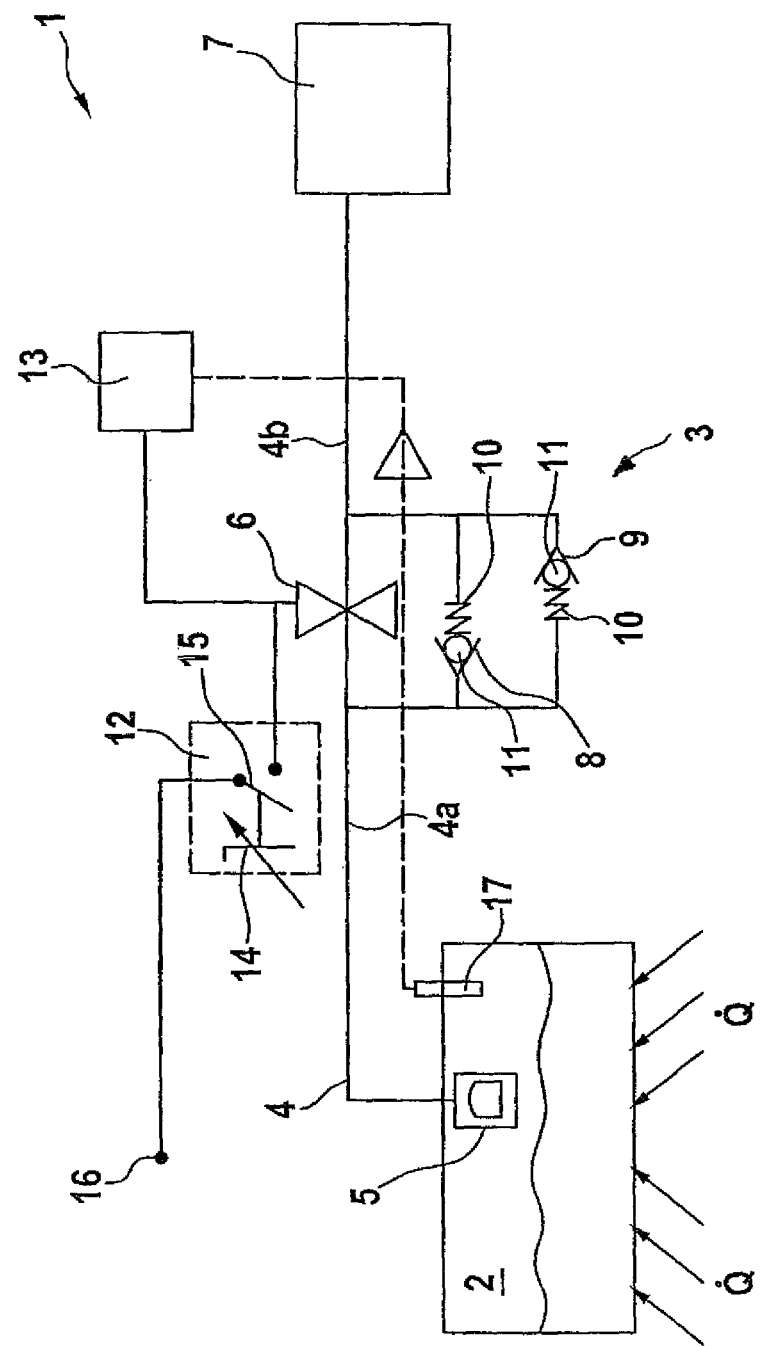

In the following, the invention is explained in more detail with reference to the exemplary embodiments shown in the drawing, without limiting the invention. It is shown in FIG. 1 a schematic representation of a fuel system of an internal combustion engine with a ventilation device, which has at least one ventilation valve for ventilating a fuel tank, wherein the ventilation valve is electrically actuatable.

Figure 2:
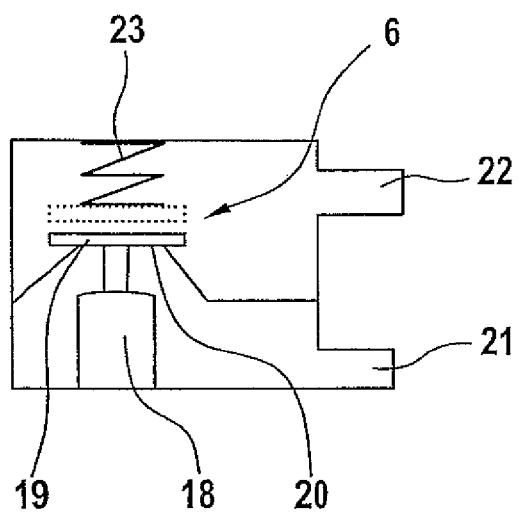
Figure 3:
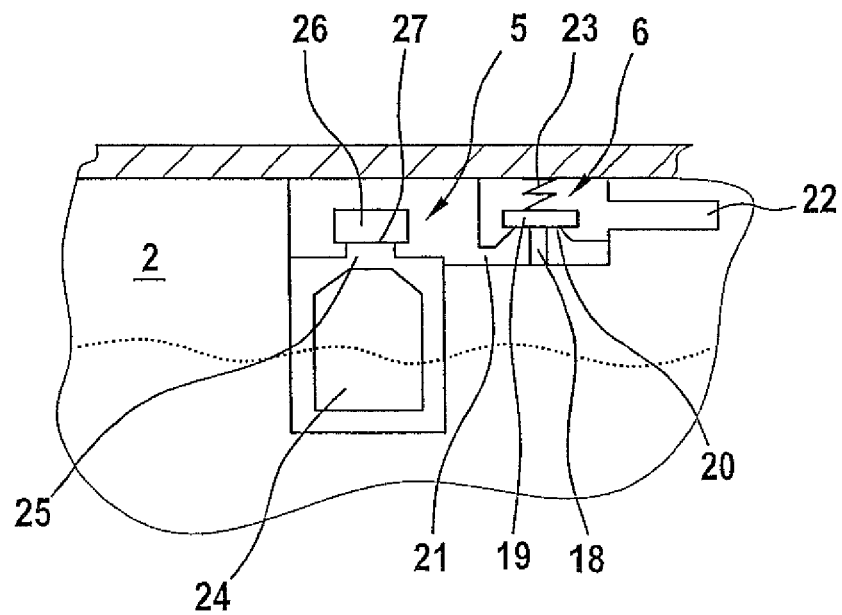
Figure 4:
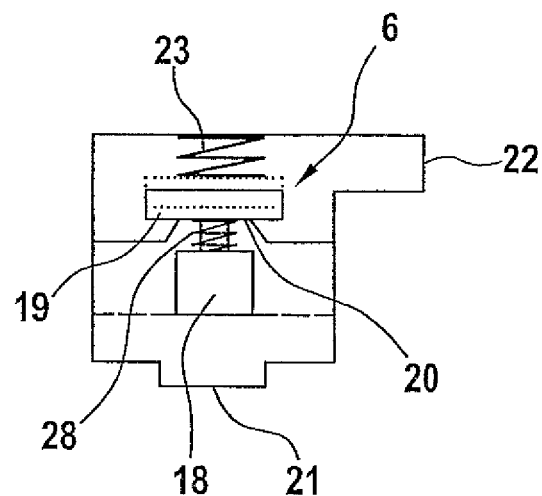
Figure 5:
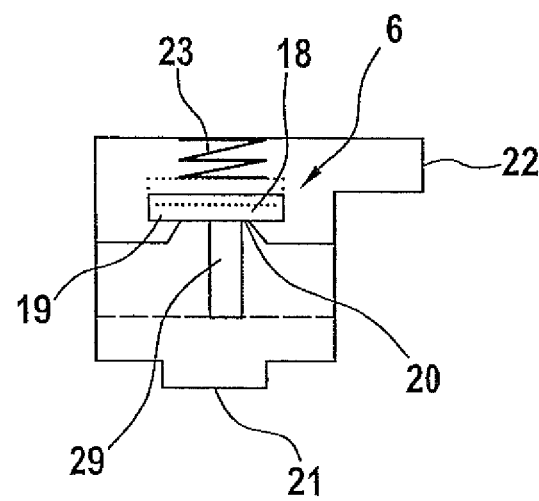
Figure 6:
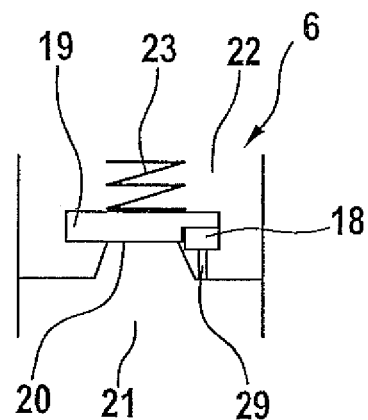
Figure 7:
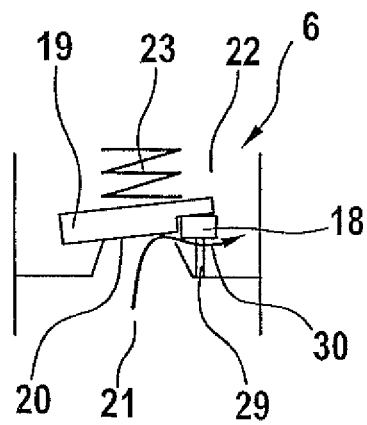
Figure 8:
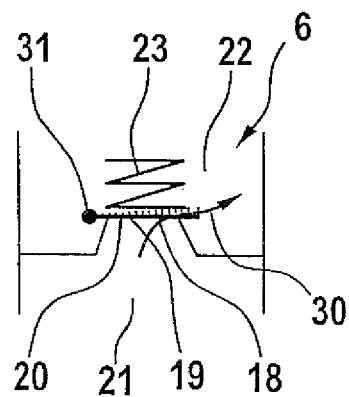

FIG. 2 a first mechanical embodiment of the ventilation valve,

FIG. 3 a second mechanical embodiment of the ventilation valve,

FIG. 4 a third mechanical embodiment of the ventilation valve,

FIG. 5 a fourth mechanical embodiment of the ventilation valve,

FIG. 6 a fifth mechanical embodiment of the ventilation valve in a first state,

FIG. 7 the ventilation valve know from FIG. 6 in a second state,

FIG. 8 a sixth mechanical embodiment of the ventilation valve.

DETAILED DESCRIPTION OF PREFERRED EMBODIMENTS

FIG. 1 shows a schematic representation of a fuel system 1. The fuel system 1 is for example part of a motor vehicle or a drive system, respectively of the motor vehicle. The fuel system 1 has a fuel tank 2 and a ventilation device 3 for ventilating the fuel tank 2. The ventilation device 3 can have a separation device which is not shown here. The separation device serves for separating fuel from a mixture of liquid and gaseous fuel. The separated liquid fuel is subsequently present in a temporary accumulator of the separation device and can be conducted back into the fuel tank 2 again for example through a return line. The return line has preferably a valve, in particular a drainage valve or a check valve, respectively. Instead of the return line, only the valve can be provided, in particular when the separation device is located at least in part in the fuel tank 2, so that fuel which escapes the temporary accumulator directly enters the tank 2 through the valve. The valve is constructed so that fuel can only leave the temporary accumulator trough the return line but cannot enter it. This prevents that fuel enters the temporary accumulator from the fuel tank through the return line.

The ventilation device 3 is in flow communication with the fuel tank 2 via a ventilation line 4. An aeration valve 5 which switches in dependence on the fuel tank fill level, is provided on the side of the ventilation line 4 which faces the fuel tank 2, or in the fuel tank 2 respectively. However, the aeration valve 5 is optional, the fuel system 1 thus also may not include the latter. Usually, the aeration valve 5 is configured so that it is only open when a fuel tank fill level is below a defined fuel tank fill level, in particular a maximal fuel tank fill level, i.e. fuel in particular gaseous fuel can enter the ventilation line 4 from the fuel tank 2. The ventilation line 4 has a ventilation valve 6 which is actuatable by means of an actuation device which is not shown here, the ventilation valve 6 and the actuation device are preferably configured so that the flow through cross section of the ventilation valve 6 is adjustable in a continuous manner. On the side which faces away from the fuel tank 2, the ventilation line 4 leads into a fuel accumulator 7, in particular an activated carbon filter. The fuel accumulator 7 serves for temporarily accumulating gaseous fuel.

Two overflow valves 8 and 9 are connected in parallel to the ventilation valve 6. The overflow valves 8 and 9 each have a closing body 11 which is spring loaded by a spring 10. They are configured so that they enable opposite directions of flow. The overflow valves 8 and 9 open or close respectively in dependence on a pressure differential between a first section 4a which is arranged on a side of the ventilation valve 4 and a second section 4b which is arranged on the opposing side of the ventilation valve 6. The overflow valve 8 opens as soon as a pressure is present in the section 4a which causes a force to act on the closing body 11 of the overflow valve 8 which is greater than a force which is caused by a pressure which is present in the section 4b plus the spring force of the spring 10 of the overflow valve 8. The overflow valve 9 on the other hand, opens when the force which is caused by the pressure which is present in the section 4b is greater than the force caused by the pressure which is present in the section 4a plus the spring force of the spring 10 of the overflow valve 9. The ventilation valve 6 can thus be bypassed by means of the overflow valves 8 and 9 when an excessive pressure is present on one side of the ventilation valve 6.

The ventilation valve 6 is connected to a control device 12 and a further control device 13. The control device 12 is also activated when the internal combustion engine is deactivated, while the further control device 13 is only activated when the internal combustion engine is activated. The control device 12 has a temperature input 14, to which a temperature sensor, which is not shown here, is connected. Thus a temperature signal is present at the temperature input 14, which indicates for example a temperature of the fuel tank 2 for example, the fuel temperature. The control device 12 has a temperature switch 15, which creates an electrical contact between a connection 16 for example a permanent positive pole of a vehicle and the ventilation valve 6, based exclusively on the temperature which is transmitted via the temperature input 14. When the temperature switch 15 is closed a ventilation of the fuel tank 2 via the ventilation valve is thus cause, on the other hand when the temperature switch is open 15, the ventilation valve 6 can be closed, so that no ventilation of the fuel tank 2 is carried out.

The further control device 13 is connected to a pressure sensor 17, by means of which an internal fuel tank pressure of the fuel tank 2 can be determined. The further control device 13 is configured for adjusting the ventilation valve 6 based at least on the internal pressure of the fuel tank, in particular based only on the internal pressure of the fuel tank. When the internal combustion engine is deactivated, the control device analyzes only the temperature, which is provided via the temperature input 14 and adjusts the ventilation valve according to the temperature. In contrast, the further control device 13 only analyzes the pressure which is determined by means of the pressure sensor 17 when the internal combustion engine is activated and also adjusts the ventilation valve 6 accordingly. The ventilation of the fuel tank 2 by means of the ventilation vale takes place thus either through the control device 12 or the further control device 13. Thus, it is sufficient when only one of the control devices 12 and 13 adjusts the ventilation valve for ventilation, to achieve the ventilation of the fuel tank.

When the internal combustion engine is deactivated, a first operating mode is given in which the ventilation valve 6 is adjusted for ventilating the fuel tank 2 exclusively based on the temperature. In contrast, when the internal combustion engine is activated a second operating mode is given in which the further control device 13 adjusts the ventilation valve 6 for ventilating the fuel tank 2 exclusively based on the internal pressure inside the fuel tank 2. As an alternative, the further control device 13 or its functionality, respectively, can of course also be integrated into the control device 12.

As an alternative or in addition, the further control device 13 can adjust the ventilation valve 6 for ventilating the fuel tank 2 over a define period of time when deactivating the internal combustion engine. In this case, the control device 12 can be absent or provided additionally. In this way, an impermissible thermal stress on the fuel tank can be avoided in spite of a heat input into the fuel tank (indicated by the arrows Q) occurring after the deactivation of the internal combustion engine, because the ventilation valve 6 is adjustable for ventilating the fuel tank 2 based exclusively on the temperature independent of the condition of the further control device 13. The ventilation valve 6 shown here is constructed in the form of an FTIV (Fuel Tank Isolation Valve) or is integrated in the latter. The FTIV is adjustable electronically for ventilating the fuel tank 2 by the control device 12 as well as by the further control device 13.

In contrast, FIGS. 2 to 8 show embodiments of the ventilation valve 6, which are separate from the FTIV. They are thus preferably provided in the fuel system 1 of FIG. 1, so that they are connected in parallel to the FTIV, insofar the latter is provided in the first place. Because the embodiments of the ventilation valve described with reference to FIGS. 2 to 8 operate purely mechanically, the control device 12 shown in FIG. 1 is not required so that the FTIV—as far as present—is adjusted for ventilating the fuel tank 2 by means of the further control device 13, while the ventilation valve operates independent of the FTIV. The ventilation valves 6 described with reference to FIGS. 2 to 8 can for example replace the overflow valve 8. As an alternative, they are arranged in the fuel tank 1 so that they can create a flow communication between the fuel tank 2 and a further device for example the fuel accumulator 7.

FIG. 2 shows a first mechanical embodiment of the ventilation valve 6. The ventilation valve 6 is configured so that it is adjustable for ventilating the fuel tank 2 based exclusively on a temperature as well as based exclusively on a pressure. For adjustment based exclusively on the temperature, a temperature deforming element 18 is provided, which is configured as wax expansion element. The temperature deforming element 18 is operationally connected to a closing body 19 of the ventilation valve 6. It is configured so that the ventilation valve 6 causes the valve seat 20 to become unblocked and with this creates a flow communication between an inlet 21 and an outlet 22. The closing body 19 is in an open position which is indicated by the dotted line. The input 21 is assigned to the fuel tank 2 and the output to the fuel accumulator 7, so that the ventilation of the fuel tank 2 occurs in the direction of the fuel accumulator 7.

However, the temperature deforming element 18 is not fixedly connected to the closing body 19. Rather, the ventilation valve 6 also allows the closing body 19 to unblock the valve seat 20 independent of the temperature deforming element 18, when a force which is applied on the closing body 19 by a pressure differential between the inlet 21 and the outlet 22 exceeds the spring force of a spring 23. The ventilation valve 6 thus enables the flow communication between inlet 21 and outlet 22 based exclusively on a temperature as well as exclusively based on a pressure or a pressure differential respectively, in each case substantially independent of one another. The spring 23 or the spring force generated by the latter counteracts the displacement of the closing body 19 by the temperature deforming element 18 or urges the latter in the direction of its closed position (indicated by the continuous line). The spring 23 is for example selected so that during normal operation of the fuel system 1 the closing body 19 is urged out of the valve seat 20 exclusively based on the temperature deforming element 18, however not based on a pressure differential between the inlet 21 and the outlet 22. The flow communication is thus only enabled exclusively based on the pressure at a pressure differential which does not occur during normal operation.

FIG. 3 shows a second mechanical embodiment of the ventilation valve 6. In the latter, the ventilation valve 6 is integrated in the aeration valve 5. The aeration valve 5 is here configured as FLVV (Fill Limit Venting Valve). The latter allows aerating the fuel tank so long as the fuel tank fill level is smaller than a defined fuel tank fill level, in particular a maximal fuel tank fill level. The aeration of the fuel tank 2 is thus ensured via the aeration valve 5, in particular when adding fuel to the fuel tank 2. As an alternative, the ventilation valve 6 can be integrated in a safety valve which is assigned to the fuel tank 2. The safety valve is for example configured as roll over safety valve ROV (Roll-Over-Valve).

The aeration valve 5 correspondingly has a float 24, which is arranged in the fuel tank 2. When the fuel in the fuel tank 2 reaches a maximal fuel tank fill level, the float 24 closes a valve seat 25 of the aeration valve 5. The aeration valve 5 at the same time has the function of an overflow valve. For this purpose, a valve body 26 is provided, which is urged out of the valve seat 27 when a defined internal fuel tank pressure is reached. In this way, the fuel tank 2 can be ventilated when the defined internal fuel tank pressure is reached, however, not when the fuel tank fill level is greater or equal to the maximal fuel tank fill level. The ventilation valve 6 is fluidly integrated in the aeration valve 5 downstream of the float 24, the valve seats 25 and 27 and the valve body 26. The construction of the ventilation valve 6 corresponds substantially to the one described in FIG. 2, so that insofar reference is made to the above elaborations. In principle, any of the embodiments of the ventilation valve 6 described here can be integrated in the aeration valve 5.

FIG. 4 shows a third mechanical embodiment of the ventilation valve 6. This embodiment corresponds substantially to the one described with reference to FIG. 2, so that here reference is also made to the above elaborations. Here, as in FIG. 2, the closing body 19 is also shown in its closed position (continuous line) as well as in its open position (dotted line). In contrast to the embodiment shown in FIG. 2, a second spring is provided here which is arranged on the side of the closing body 19 which opposes the first spring 23. The second spring 28 is supported on one hand on the temperature deforming element 18, and on the other hand on the closing body 19. The second spring 28 thus acts in opposition to the spring 23. In this way, the ventilation valve 6 can be adjusted so that the closing body 19 can be urged out of the valve seat 20 based exclusively on the temperature (by means of the temperature deforming element) as well as based exclusively on the pressure differential between the inlet 21 and the outlet 22, i.e. the ventilation valve is adjusted for ventilating the fuel tank 2.

FIG. 5 shows a fourth mechanical embodiment of the ventilation valve 6. Here, reference is first made to the above elaborations as well. Here, however, the closing body 19 itself is constructed as the temperature deforming element 18 or includes the latter at least in part. In order to support the closing body 19 or the temperature deforming element 18, a support element 29 is provided. The support element 29 can engage the closing body 19 or the temperature deforming element 18 off center. In case of an expansion of the temperature deforming element 18 a relatively small force is thus already sufficient for achieving a lifting or tilting by deformation of the temperature deforming element 18 and with this at least a partial unblocking of the valve seat 20. The temperature deforming element 18 thus does not have to act in opposition to the entire spring force generated by the spring 23 to adjust the ventilation valve for ventilating the fuel tank 2 or for enabling the flow communication between the inlet 21 and the outlet 22. The support element 29 is optional in this embodiment, because at least a partial unblocking of the valve seat 20 can already be achieved by a deformation of the temperature deforming element 18 and its support on the valve seat 20.

FIG. 6 shows a fifth mechanical embodiment of the ventilation valve 6. Shown is the closing body 10 of the ventilation valve 6 in its closed position. Here, reference is first made to the above elaborations as well. The temperature deforming element 18 is arranged between the support element 29 and the closing body 19, wherein it engages off center on the latter. The support element 29 is not required, when the temperature deforming element 18 can be directly fastened to the ventilation valve 6 for example on a walling of the latter. Through the off center engagement of the temperature deforming element 18 on the closing body 19, the force required for opening, which has to act in opposition to the spring force of the spring 23 is significantly reduced. The support element 29 can be arranged on the temperature deforming element 18 so that it is urged out of the latter or urged into the latter, respectively, when the temperature changes.

FIG. 7 shows the ventilation valve of FIG. 6, wherein the closing body is in its open position, so that a flow communication between the inlet 21 and the outlet 22 is given. The flow communication is indicated by the arrow 30.

FIG. 8 shows a sixth embodiment of the ventilation valve 6. Here, reference is first made to the above elaborations as well. The closing body 19 is constructed as temperature deforming element 18, analogous to the embodiment of FIG. 5 and is here a bimetal element. The latter is rotatably supported in a support hinge 31 or a bearing site, respectively. The bearing is configured so that the valve seat 20 is unblocked when the bimetal or the temperature deforming element 18, respectively, is deformed. In FIG. 8, the closing body is again shown in its closed position (continuous line) and in its open position (dotted line).

What is claimed is:

1. A method for operating a fuel system of an internal combustion engine, comprising adjusting a ventilation valve of a ventilation device of a fuel system for ventilating a fuel tank in a first operating mode exclusively as a function of a temperature when the internal combustion engine is deactivated.

2. The method of claim 1, further comprising ventilating the fuel tank over a defined period of time when the internal combustion engine is deactivated.

3. The method of claim 1, wherein the ventilation valve is adjusted for ventilating the fuel tank when the temperature falls below or exceeds a threshold temperature.

4. The method of claim 2, wherein the defined period of time is selected so that an internal fuel tank pressure is reduced by a defined pressure differential.

5. The method of claim 1, wherein the temperature is a member selected from the group consisting of an ambient temperature, an internal fuel tank temperature, a fuel temperature, a ventilation valve temperature, a line temperature or a separation device temperature.

6. The method of claim 1, wherein the ventilation valve is integrated in a member selected from the group consisting of an aeration valve which switches in dependence on the fuel tank fill level, a safety valve which is assigned to the fuel tank, a tank lid of the fuel tank, a separation device, the fuel tank and an overflow valve or fluidly arranged upstream of, downstream of, or in parallel to the member.

7. The method of claim 1, wherein the ventilation valve has at least one temperature deforming element.

8. The method of claim 7, wherein the temperature deforming element is a temperature expansion element.

9. The method of claim 7, wherein the temperature deforming element is a wax expansion element or a bimetal element.

10. The method of claim 7, wherein the temperature deforming element is a bimetal element.

11. The method of claim 1, further comprising adjusting the ventilation valve in a second operating mode exclusively as a function of a pressure.

12. The method of claim 11, further comprising ventilating the fuel tank over a defined period of time when the internal combustion engine is deactivated.

13. The method of claim 11, wherein the ventilation valve is adjusted for ventilating the fuel tank when the temperature falls below or exceeds a threshold temperature.

14. The method of claim 12, wherein the defined period of time is selected so that an internal fuel tank pressure is reduced by a defined pressure differential.

15. The method of claim 11, wherein the ventilation valve is integrated in a member selected from the group consisting of an aeration valve which switches in dependence on the fuel tank fill level, a safety valve which is assigned to the fuel tank, a tank lid of the fuel tank, a separation device, the fuel tank and an overflow valve or fluidly arranged upstream of, downstream of, or in parallel to the member.

16. The method of claim 11, wherein the ventilation valve has at least one temperature deforming element.

17. The method of claim 16, wherein the temperature deforming element is a temperature expansion element.

18. The method of claim 16, wherein the temperature deforming element is a wax expansion element or a bimetal element.

19. The method of claim 16, wherein the temperature deforming element is a bimetal element.

20. The method of claim 11, further comprising adjusting the ventilation valve in a third operating mode as a function of a temperature and a pressure.

21. The method of claim 20, further comprising ventilating the fuel tank over a defined period of time when the internal combustion engine is deactivated.

22. The method of claim 20, wherein the ventilation valve is adjusted for ventilating the fuel tank when the temperature falls below or exceeds a threshold temperature.

23. The method of claim 21, wherein the defined period of time is selected so that an internal fuel tank pressure is reduced by a defined pressure differential.

24. The method of claim 20, wherein the temperature is a member selected from the group consisting of an ambient temperature, an internal fuel tank temperature, a fuel temperature, a ventilation valve temperature, a line temperature or a separation device temperature.

25. The method of claim 20, wherein the fuel system further comprises a control device and a further control device, wherein at least when the internal combustion engine is deactivated, the control device analyzes the temperature and correspondingly adjusts the ventilation valve, and wherein the control device or the further control device analyzes at least the pressure and correspondingly adjusts the ventilation valve, only when the internal combustion engine is deactivated.

26. The method of claim 20, wherein the ventilation valve is integrated in a member selected from the group consisting of an aeration valve which switches in dependence on the fuel tank fill level, a safety valve which is assigned to the fuel tank, a tank lid of the fuel tank, a separation device, the fuel tank and an overflow valve or fluidly arranged upstream of, downstream of, or in parallel to the member.

27. The method of claim 20, wherein the ventilation valve has at least one temperature deforming element.

28. The method of claim 27, wherein the temperature deforming element is a temperature expansion element.

29. The method of claim 27, wherein the temperature deforming element is a wax expansion element or a bimetal element.

30. The method of claim 27, wherein the temperature deforming element is a bimetal element.

31. A fuel system of an internal combustion engine, comprising:
a fuel tank; and
a ventilation device for ventilating the fuel tank, said ventilation device having at least one ventilation valve, wherein the fuel system is configured for adjusting the ventilation valve for ventilation of the fuel tank in a first operating mode exclusively as a function of a temperature, wherein the ventilation occurs over a defined period of time when the internal combustion engine is deactivated.

32. The fuel system of claim 31, wherein the fuel system is configured for adjusting the ventilation valve for ventilation of the fuel tank in a second operating mode exclusively as a function of a pressure.

33. The fuel system of claim 31, wherein the fuel system is further configured for adjusting the ventilation valve for ventilation of the fuel tank in a third operating mode exclusively as a function of pressure.

34. the fuel system of claim 31, wherein the fuel system is further configured for adjusting the ventilation valve for ventilation of the fuel tank in a third operating mode exclusively as a function of a temperature and a pressure.

35. A method for operating a fuel system of an internal combustion engine, comprising adjusting at least one ventilation valve of a ventilation device of the fuel system for ventilating a fuel tank in one of three ways, a first way corresponding to a first operating mode, exclusively as a function of a temperature, a second way corresponding to a second operating mode, exclusively as a function of a pressure, a third way, corresponding to a third operating mode, as a function of the temperature and the pressure, wherein said ventilating takes place over a defined period of time when the internal combustion engine is deactivated.

* * * * *